United States Patent
Wu et al.

(10) Patent No.: US 11,789,173 B1
(45) Date of Patent: Oct. 17, 2023

(54) REAL-TIME MICROSEISMIC MAGNITUDE CALCULATION METHOD AND DEVICE BASED ON DEEP LEARNING

(71) Applicant: Institute of Geology and Geophysics, Chinese Academy of Sciences, Beijing (CN)

(72) Inventors: Shaojiang Wu, Beijing (CN); Yibo Wang, Beijing (CN); Yikang Zheng, Beijing (CN); Yi Yao, Beijing (CN)

(73) Assignee: Chinese Academy of Sciences, Institute of Geology and Geophysics, Beijing (CN)

( * ) Notice: Subject to any disclaimer, the term of this patent is extended or adjusted under 35 U.S.C. 154(b) by 0 days.

(21) Appl. No.: 18/304,026

(22) Filed: Apr. 20, 2023

(51) Int. Cl.
*G01V 1/50* (2006.01)
*G06N 3/047* (2023.01)
*G06N 3/08* (2023.01)

(52) U.S. Cl.
CPC ............... *G01V 1/50* (2013.01); *G06N 3/047* (2023.01); *G06N 3/08* (2013.01)

(58) Field of Classification Search
CPC ............. G01V 1/50; G06N 3/047; G06N 3/08
See application file for complete search history.

(56) References Cited

U.S. PATENT DOCUMENTS

| | | | |
|---|---|---|---|
| 2020/0174149 A1* | 6/2020 | Thiruvenkatanathan | ..................... G01V 1/307 |
| 2021/0089897 A1* | 3/2021 | Zhang | ..................... G01V 1/306 |
| 2022/0129788 A1* | 4/2022 | Zhang | ..................... G06N 20/00 |
| 2023/0054654 A1* | 2/2023 | Dawson | ..................... G01V 1/50 |

OTHER PUBLICATIONS 202211206267.7 First Office Action; The State Intellectual Property Office of the People's Republic of China dated Nov. 11, 2022; pp. 1-4; Beijing, China.

(Continued)

*Primary Examiner* — Krystine E Breier
(74) *Attorney, Agent, or Firm* — IP Gentleman Intellectual Property Services, LLC; Addison D. Ault; Richard Moerschell (57) ABSTRACT

Embodiments of the present disclosure provide a real-time microseismic magnitude calculation method based on deep learning and a corresponding device. The method includes: constructing a DAS-based horizontal well microseismic monitoring system; constructing a training data set; constructing a magnitude calculation module, wherein the magnitude calculation module comprises two input branches of frequency spectrum and time waveform, the two input branches use a 3-layer convolution structure to extract frequency characteristic and waveform characteristic of a microseismic event, and then a model fusion is performed, and then 2 fully connected layers are used, and finally a calculated magnitude is outputted; training the magnitude calculation module; and analyzing and processing field data. The microseismic magnitude calculation method in the present disclosure improves the ability to quickly estimate the microseismic magnitude, without the need for converting the strain data, and improves the accuracy of the microseismic magnitude estimation.

14 Claims, 3 Drawing Sheets

(56) References Cited

OTHER PUBLICATIONS 202211206267.7 First Office Action; The State Intellectual Property Office of the People's Republic of China dated Nov. 11, 2022; pp. 1-4; Beijing, China (English Translation).
202211206267.7 Notice of Allowance; The State Intellectual Property Office of the People's Republic of China dated Nov. 11, 2022; p. 1; Beijing, China.
202211206267.7 Notice of Allowance; The State Intellectual Property Office of the People's Republic of China dated Nov. 11, 2022; p1.2; Beijing, China (English Translation).

\* cited by examiner

REAL-TIME MICROSEISMIC MAGNITUDE CALCULATION METHOD AND DEVICE BASED ON DEEP LEARNING

CROSS-REFERENCE TO RELATED APPLICATION

This application claims priority to Chinese Patent Application No. 202211206267.7, filed on Sep. 30, 2022 before the China National Intellectual Property Administration, the disclosure of which is incorporated herein by reference in entirety.

TECHNICAL FIELD

The present disclosure relates to the field of microseismic monitoring and deep learning. In particular, the disclosure relates to a real-time microseismic magnitude calculation method based on deep learning and a corresponding device, wherein the method includes using a training data set to train a magnitude calculation module, analyzing and processing field data, and inputting the processed data to the magnitude calculation module so as to obtain the calculated magnitude, etc. Therefore, the present disclosure belongs to the field of seismic data processing in seismic monitoring.

BACKGROUND

Hydraulic fracturing technology relates to injection of high-pressure fluid into shale reservoirs to generate complex artificial fractures, which can increase the connectivity of reservoirs and increase well production. Monitoring and evaluating the effects of hydraulic fracturing on reservoir substructures in different stages is a prerequisite for efficient exploitation and safe production. Microseismic monitoring technology is an important means for real-time monitoring of hydraulic fracturing stimulation of unconventional resources. Microseismic monitoring technology evaluates fracturing effects by monitoring microseismic signals generated during hydraulic fracturing, and then improves and optimizes engineering parameters.

Quickly and accurately estimating the magnitude of a microseismic event is an important part of microseismic monitoring, and the magnitude of a microseismic event is usually around −3 to 3 Ml. In the earthquake study, key indicators of the traditional methods are extracted from initial earthquake motion information as characteristic parameters, and then an empirical formula is used to relate the characteristic parameters to the magnitude of the earthquake. There are many options for selecting characteristic parameters, which may include amplitude parameters, period (frequency) parameters, and energy parameters of the initial earthquake motion. Although it has been proved that there is a generally linear relationship between the above characteristic parameters and the magnitude, some characteristic parameters are only loosely related to the magnitude, leading to errors in magnitude estimation results. Magnitude estimation results often lead to overestimation of small earthquakes and underestimation of larger earthquakes, to a greater or lesser extent. Further, we can try to estimate the magnitude by using two or more of the above three types of parameters in combination, so as to improve the accuracy of earthquake magnitude estimation. Magnitude estimation methods also include methods of characteristic frequency parameters based on period, such as the maximum predominant period $P_d$ (peak displacement) method, the average predominant period $\tau_c$ method, and so on. In addition, if there are data from multiple stations, the magnitudes from each station can be estimated, and then the weighted average can be used to obtain a magnitude estimate.

Since earthquake magnitude determination is a very complicated process, it is necessary to comprehensively consider the influence of multiple factors such as source process, propagation medium, site condition, and instrument response. Although a single amplitude or periodic parameter reflects the scale of an earthquake, it is difficult to capture all the characteristics of the earthquake, resulting in insufficient accuracy of earthquake magnitude determination. In recent years, with the rapid development of deep learning technology, more and more researchers have begun to apply machine learning and deep learning to various elements of earthquake waveform data research, and artificial intelligence has been introduced into the research of earthquake magnitude estimation. Deep learning-based techniques can generally be divided into two categories. One is to combine multiple earthquake pre-warning parameters with machine learning methods to estimate the final magnitude. Researchers have integrated various types of 12 initial characteristic parameters of P wave (amplitude parameters, period parameters, energy parameters, and derivative parameters) as an input of a convolutional neural network, and constructed a DCNN-M model in 3 s time period after the arrival of P wave. This has been used for earthquake pre-warning magnitude estimation, with better results than the traditional single parameter method. Ochoa (2018) used 25 parameters (parameters related to azimuth, parameters related to magnitude, parameters related to epicentral distance) obtained after 5 seconds of P wave triggering from a single station to estimate the Richter magnitude scale, based on the Support Vector Regression algorithm. For earthquakes below 4.5, this magnitude estimation has a small error. Another method is to directly combine earthquake waveform data with machine learning methods to improve magnitude estimation. For example, a recently proposed method uses strong motion data to establish a NN network for earthquake pre-warning magnitude estimation, using waveform spectrum information as model input. It was found that, within the 3 s time period, this method is superior to the traditional single parameter method, and it is also believed that the use of multi-characteristic combination input will lead to a better magnitude estimation model. Mousavi & Beroza (2020) constructed a magnitude estimation model composed of a convolutional neural network and a recurrent neural network based on a 30 seconds of single-station waveform input, which effectively improved the magnitude estimation results. Furthermore, a convolutional neural network model with multiple fully connected layers is established, and the frequency domain data of P wave at different periods of 3-9 s, the source information (epicentral distance and source depth) and site information of the corresponding earthquake event are selected as full data set, to train the proposed model and evaluate the estimation performance. Lomax (2019) used three-component acceleration time history data of a single station as input data of a first convolutional layer, normalized the acceleration peak value in the three-component band, and used the normalized value as auxiliary input parameters of the fully connected layer, then using the above two parts of data to iteratively train the model to achieve the purpose of automatic detection and rapid characterization of earthquake magnitude.

However, at present, there is no magnitude calculation method which uses microseismic strain data monitored from offset-wells by DAS (Distributed Acoustic Sensor). After searching patent databases, there is only a magnitude calculation method using conventional geophone seismic data (generally displacement, velocity or acceleration data, not strain data) and a magnitude calculation method using conventional geophone microseismic data.

SUMMARY

The purpose of the present disclosure is to at least partly overcome the defects of the prior art, and provide a real-time microseismic magnitude calculation method and a corresponding device based on deep learning.

In an embodiment, the present disclosure provides a real-time microseismic magnitude calculation method based on deep learning, in which the strain data collected by a DAS system may be inputted directly without converting the DAS strain data to conventional data (generally displacement, velocity or acceleration data), thereby improving the ability to quickly estimate the microseismic magnitude.

In an embodiment, the present disclosure provides a real-time microseismic magnitude calculation method based on deep learning to improve the accuracy of the microseismic magnitude estimation.

In an embodiment, the present disclosure provides a real-time microseismic magnitude calculation device based on deep learning, which is used for implementing the aforementioned real-time microseismic magnitude calculation method based on deep learning.

In order to achieve the above-mentioned embodiments, the technical solutions of the present disclosure are as follows:

A real-time microseismic magnitude calculation method based on deep learning, comprising:
constructing a DAS-based horizontal well microseismic monitoring system;
constructing a training data set, comprising DAS microseismic strain data and theoretical magnitude Gaussian distribution label;
constructing a magnitude calculation module, wherein the magnitude calculation module comprises two input branches of frequency spectrum and time waveform, the two input branches use a 3-layer convolution structure to extract frequency characteristic and waveform characteristic of a microseismic event, and then a model fusion is performed, and then 2 fully connected layers are used, and finally a calculated magnitude is outputted; wherein an input of the magnitude calculation module is a single DAS microseismic strain data, and an output is the calculated magnitude, and an error between the calculated magnitude and a theoretical magnitude Gaussian distribution is used to update network parameters; wherein the network uses a mean square error as a loss function to calculate an error of a neural network;
training the magnitude calculation module by using the training data set; and
analyzing and processing field data, comprising: preprocessing the field data; and
inputting the preprocessed data into the magnitude calculation module to obtain the calculated magnitude.

According to some embodiments of the present disclosure, the training data set comprises Nk DAS microseismic strain data, each DAS microseismic strain data comprises Nt channels, each channel comprises Ns sampling points, forming a data body of Nk*Nt*Ns, where Nk, Nt and Ns are all 1000.

According to some embodiments of the present disclosure, the theoretical magnitude Gaussian distribution label is a Gaussian distribution centered on the theoretical magnitude, the magnitude ranges from −3 to 3, the resolution is 0.1, and it is a vector with 61 values.

According to some embodiments of the present disclosure, the constructing a training data set comprises:
generating initial microseismic data;
data-augmenting the initial microseismic data; and
preprocessing all data.

According to some embodiments of the present disclosure, the single initial microseismic data is generated by:
setting acquisition parameters according to the real microseismic monitoring system, comprising setting source parameters which comprises source mechanism parameters, source mechanism range and source location parameters;
using a analytical Green's function under a uniform velocity model to obtain synthetic DAS microseismic strain data, with a size of Nt*Ns;
collecting monitored background noise data, adding the background noise data to the above-mentioned synthetic DAS microseismic strain data, simulating a signal-to-noise ratio and characteristics of collected filed data, to obtain the synthetic microseismic data.

According to some embodiments of the present disclosure, the magnitude distribution is a Gaussian distribution of the current microseismic theoretical magnitude, with a distribution calculation formula of $$M(z) = \frac{(z-z_0)^2}{2\sigma^2},$$

where $z_0$ is a theoretical magnitude, $\sigma$ is a Gaussian distribution value; the magnitude ranges from −3 to 3, the resolution is 0.1, the number of type labels is 61, and the displacement $M(z)$ corresponds to the current magnitude.

According to some embodiments of the present disclosure, the data-augmenting the initial microseismic data comprises:
magnifying or shrinking the synthetic DAS microseismic strain data according to different amplitude scales;
constructing abnormal traces; and
magnifying or shrinking the background noise data according to different amplitude scales.

According to some embodiments of the present disclosure, the preprocessing all data comprises:
performing interpolation and replacement to damaged channel data by adjacent channels, removing mean value, removing abnormally large value, and replacing the removed abnormally large value by interpolation.

According to some embodiments of the present disclosure, the magnitude calculation module uses a 2D convolutional layer, the convolutional layer group comprises a convolutional layer, a max pooling layer, and a Dropout layer, the convolution operation uses a ReLu activation function to extract characteristic from the inputted data, the max pooling layer is after the convolutional layer, a rectified linear unit is used for activation in each hidden convolutional layer, and the kernel size of the convolution is set to 64×3×3; the final output layer is a vector of 1*61, corresponding to magnitude −3 to magnitude 3 of seism magnitude, then a maximum value is taken as the current calculated magnitude.

According to some embodiments of the present disclosure, the 3-layer convolutional structure comprises a convolutional layer, a pooling layer and a fully connected layer.

According to some embodiments of the present disclosure, the training the magnitude calculation module by using the training data set comprises:

dividing the data set into a training set and a test set with a ratio of 8:2;

letting a neural network model adopt a stochastic gradient descent optimization method; setting a dynamic learning rate, the initial value being set to 0.0001, reduced by half every 50 times; the batch size being set to 40; the number of iterations being 200; and training the neural network model on a graphics processing unit (GPU).

According to some embodiments of the present disclosure, the DAS-based horizontal well microseismic monitoring system comprises a metal sleeve and an armored optical cable fixedly arranged outside the metal sleeve, and a single-mode optical fiber is arranged in the armored optical cable;

wherein constructing a DAS-based horizontal well microseismic monitoring system comprises:

inserting the metal sleeve and the armored optical cable into a drilled wellbore synchronously;

pumping cement slurry from a bottom of a well, letting the cement slurry return to a wellhead from the bottom of the well along an annular space between an outer wall of the metal sleeve and the wellbore, allowing the metal sleeve, the armored optical cable and formation rock to be fixed together after the cement slurry is solidified; and providing a DAS modem, and connecting the single-mode optical fiber in the armored optical cable to a DAS signal input port of the DAS modem at the wellhead.

According to some embodiments of the present disclosure, the preprocessing the field data comprises:

performing interpolation and replacement to damaged channel data by adjacent channels, removing mean value, removing abnormally large value, and replacing the removed abnormally large value by interpolation.

According to another aspect of the present disclosure, there is provided a real-time microseismic magnitude calculation device based on deep learning, wherein, the calculation device is used for implementing the real-time microseismic magnitude calculation method based on deep learning according to any one of the foregoing embodiments.

The present disclosure proposes a real-time microseismic magnitude calculation method and a corresponding device based on deep learning, which integrates waveform and frequency spectrum characteristics with a deep model network, and trains the model through continuous DAS strain records, without the need for converting the DAS strain data to conventional seismic data (generally displacement, velocity or acceleration data), improving the ability to quickly estimate the microseismic magnitude and improving the accuracy of the microseismic magnitude estimation.

DETAILED DESCRIPTION OF EMBODIMENTS

In order to make the above objectives, features, and advantages of the present disclosure more understandable, the present disclosure will be described in further detail below with reference to the accompanying drawings and the specific embodiments.

Distributed Acoustic Sensing (DAS) is an emerging data acquisition technology that has developed rapidly in recent years. DAS generally consists of a demodulator (including an optical system and a signal acquisition system) and a normal optical fiber or a special optical fiber for sensing. DAS realizes the measurement of strain signal along the axial direction of the optical fiber by detecting a phase change of backward Rayleigh scattering light generated by the laser pulse in the internal scatterer of the optical fiber.

In DAS hydraulic fracturing monitoring, DAS optical fibers are generally arranged along the horizontal well. Compared with conventional geophone detection, DAS can obtain the measurement data of the whole well section, which greatly increases the azimuth of data collection; DAS has 1 m spatial sampling, which significantly improves the density and spatial continuity of the monitoring data.

The deep learning method is a good tool to solve difficult problems in the field of seismology and geophysical research. The application of deep learning in the field of seismology continues to expand, for example, to seismic phase identification, first arrival picking, source location, etc.

Figure 1:
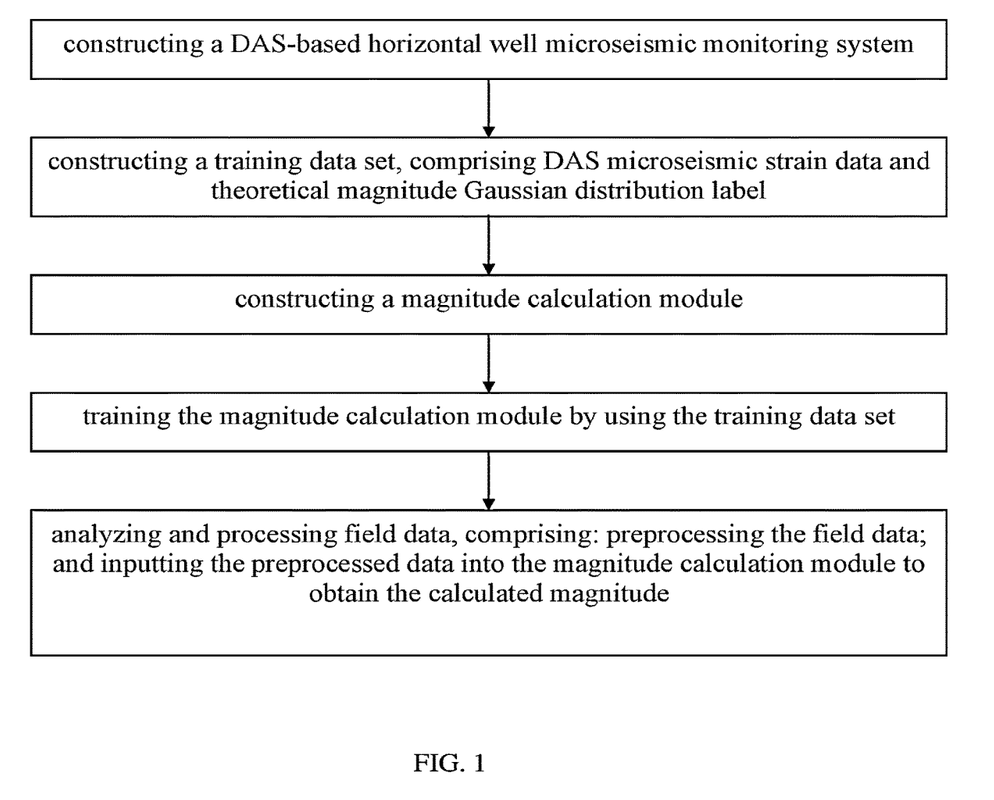
FIG. 1 is a flowchart of a real-time microseismic magnitude calculation method based on deep learning according to an embodiment of the present disclosure.
Figure 2:
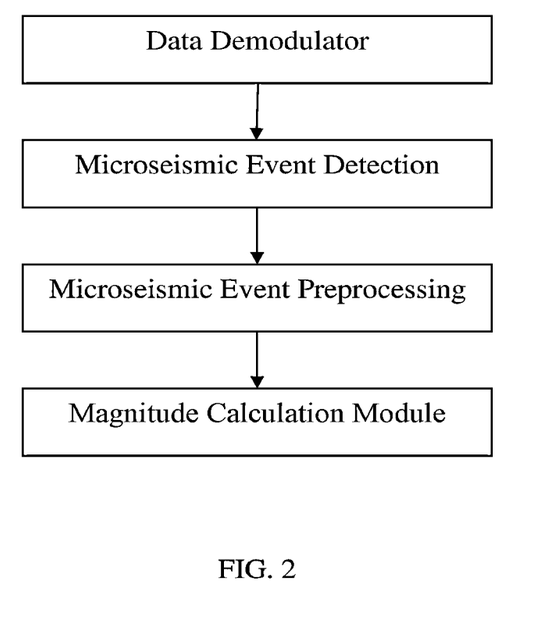
FIG. 2 shows a software data processing flow of a real-time microseismic magnitude calculation method based on deep learning according to an embodiment of the present disclosure.

The present disclosure proposes a method for quickly estimating seismic magnitude based on deep learning and feature fusion, which integrates waveform and frequency spectrum characteristics with deep model network, and trains the model through continuous DAS strain records, improving the ability to quickly estimate the seismic magnitude. According to a specific embodiment of the present disclosure, a real-time microseismic magnitude calculation method based on deep learning is proposed, and the calculation method is carried out in accordance with FIG. 1 (FIG. 1):

Firstly, a DAS-based horizontal well microseismic monitoring system is constructed. The DAS-based horizontal well microseismic monitoring system comprises a metal sleeve and an armored optical cable fixedly arranged outside the metal sleeve, and a single-mode optical fiber is arranged in the armored optical cable; the DAS modem is placed near a wellhead, the DAS signal port of the DAS modem is connected to the special single-mode optical fiber outside the metal sleeve.

Specifically, the construction of a DAS-based horizontal well microseismic monitoring system includes:

slowly and synchronously inserting the metal sleeve and the armored optical cable into a drilled wellbore;

installing a ring-shaped metal clamp at the joint of two metal sleeves at the wellhead to fix and protect the armored optical cable from moving and/or being damaged during the process of inserting the metal sleeve;

pumping cement slurry from the bottom of the well by a high-pressure pump truck, letting the cement slurry return to the wellhead from the bottom of the well along an annular space between an outer wall of the metal sleeve and the wellbore, allowing the metal sleeve, the armored optical cable and formation rock to be permanently fixed together after the cement slurry is solidified;

providing the DAS modem, and connecting the single-mode optical fiber in the armored optical cable to a DAS signal input port of the DAS modem at the wellhead.

During hydraulic fracturing operation, the DAS-based horizontal well microseismic monitoring system may use the armored optical cables permanently arranged outside the metal sleeve to perform hydraulic fracturing microseismic monitoring. The single-mode optical fibers outside the metal sleeve arranged in the well are used to collect data, the data is transmitted to the DAS modem near the wellhead for demodulation, then the microseismic events are obtained, wherein the microseismic events are generated from the stimulated fracture of the underground reservoir of the offset well or in-well when the continuously-hydraulic fracturing operation is performed. Combining with the longitudinal wave velocity field of the underground reservoir obtained in the preceding step, relevant information of the microseismic events can be obtained, and such information includes the time, three-dimensional spatial position and energy magnitude of the microseismic events.

Furthermore, focal mechanism analysis and magnitude analysis can be performed according to the recorded longitudinal wave signal characteristics of the microseismic events, so as to obtain fracture mechanism of the most microseismic events, and the distribution characteristic and regularity of fractures after the hydraulic fracturing operation may be analyzed. Based on the above information, the effective and reliable, qualitative and quantitative evaluation of the hydraulic fracturing effect of reservoir can be carried out.

The real-time microseismic magnitude calculation method based on deep learning further includes:

Constructing a Training Data Set:

Overview of the data set: The structure of the data set is like this: (2D microseismic data, 1D theoretical magnitude Gaussian distribution label). For the single DAS microseismic strain data, a total of Nt (1000) channels are included, each channel includes Ns (1000) sampling points, and the training data set includes Nk (1000) DAS microseismic strain data. The theoretical magnitude Gaussian distribution label is a 1D Gaussian distribution centered on the theoretical magnitude. The magnitude ranges from −3 to 3 Ml, and the resolution is 0.1, and it is a vector with 61 values. Therefore, the data body is Nk*Nt*Ns and the number of the type labels is Nk*61.

Data generation: generating initial microseismic data: the single initial microseismic data is generated by:

setting acquisition parameters according to the real microseismic monitoring system, comprising: setting source parameters, which includes source mechanism parameters and range (only consider the case of double-couple source): dip, rake, strike, wherein these parameters cover the range of the main source mechanism; source location parameters: sx, sy, sz, wherein the location should not be located near the fracturing section, to simulate possible seismic source locations;

using a analytical Green's function under a uniform velocity model (Nx*Ny*Nz) to obtain synthetic DAS microseismic strain data, with a size of Nt*Ns;

collecting monitored background noise data, adding the background noise data to the above-mentioned synthetic DAS microseismic strain data, simulating a signal-to-noise ratio and characteristics of collected field data, to obtain the initial microseismic data.

The magnitude distribution is a Gaussian distribution of the current microseismic theoretical magnitude, with a distribution calculation formula of $$M(z) = \frac{(z-z_0)^2}{2\sigma^2},$$

where $z_0$ is a theoretical magnitude, $\sigma$ is a Gaussian distribution value; the magnitude ranges from −3 to 3, the resolution is 0.1, so the network has a total of 61 labels, and the displacement M(z) corresponds to the current magnitude.

Data augmentation: data-augmenting the initial microseismic data: magnifying or shrinking the synthetic DAS microseismic strain data according to different amplitude scales; constructing abnormal traces (bad traces, missing traces); and magnifying or shrinking the background noise data according to different amplitude scales.

Data preprocessings: performing interpolation and replacement to damaged channel data by adjacent channels, removing mean value, removing abnormally large value, and replacing the removed abnormally large value by interpolation.

Figure 3:
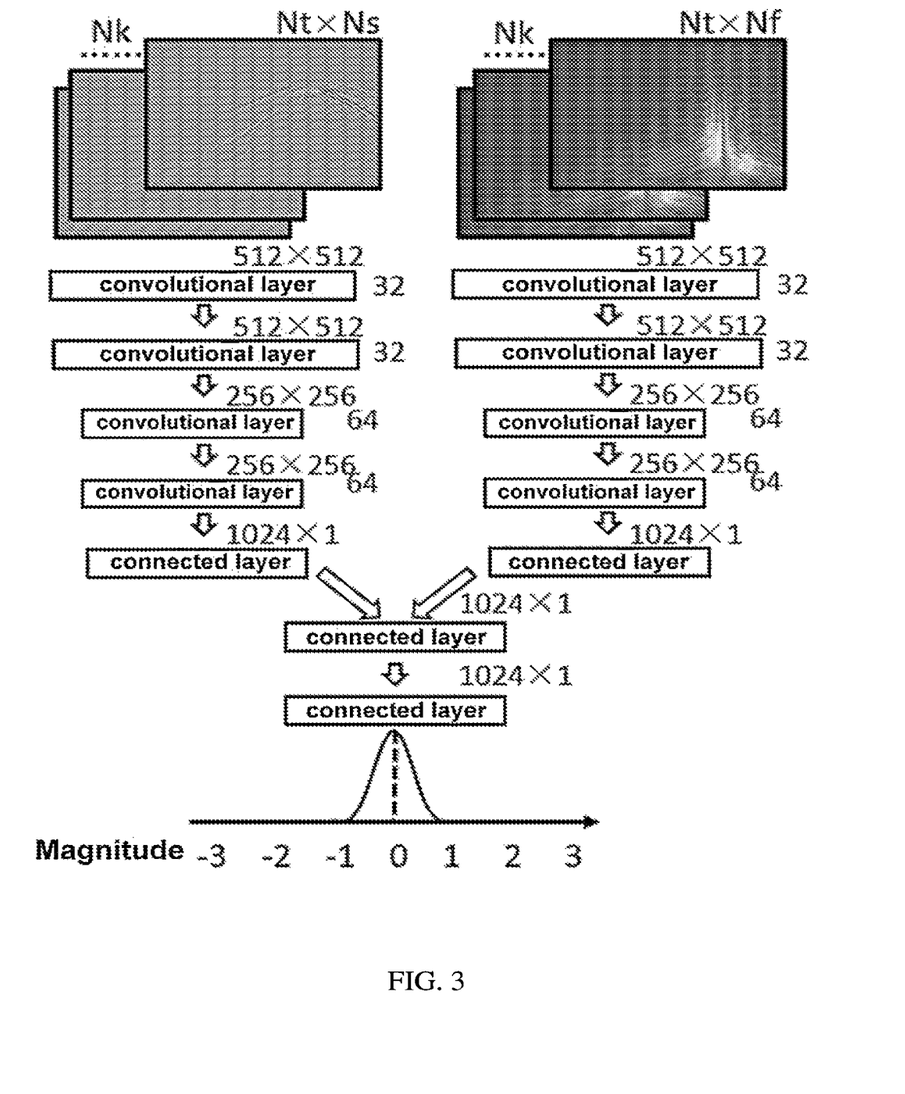
FIG. 3 is a schematic diagram of a network structure of a real-time microseismic magnitude calculation method based on deep learning according to an embodiment of the present disclosure.

Constructing a Magnitude Calculation Module:

2.1. Module architecture: As shown in FIG. 3, the magnitude calculation module consists of two parts, including two input branches of frequency spectrum and time waveform, the two input branches use a three-layer convolution structure (convolution layer, pooling layer, activation function, fully connected layer), to extract frequency characteristic and waveform characteristic of the microseismic event, and then a model fusion is performed, and then 2 fully connected layers are used, and finally a calculated magnitude is outputted. The magnitude calculation module uses a 2D convolutional layer, the convolutional layer group includes a convolutional layer, a max pooling layer, and a Dropout layer, the convolution operation uses a ReLu activation function to extract characteristic from the inputted data, the max pooling layer is right after the convolutional layer, its main functions are dimensionality reduction, feature compression, and network complexity simplification. The Dropout layer refers to discarding neurons from the network according to a certain probability, thereby reducing the risk of over-fitting of the model. A rectified linear unit is used for activation in each hidden convolutional layer, and the kernel size of the convolution is set to (64×3×3); padding and stride are 1 and 2, respectively. The final output layer is a vector of 1*61, corresponding to magnitude −3 to magnitude 3 of seism magnitude, then a maximum value is taken as the current calculated magnitude.

2.2. Module IO: The input of the computational neural network model is the single DAS microseismic strain data, and the output is the calculated magnitude. An error between the calculated magnitude and theoretical magnitude Gaussian distribution is used to update network parameters. The network uses a mean squared error (MSE) as a loss function to calculate the error of the neural network.

FIG. 3 shows a network structure of the real-time microseismic magnitude calculation method based on deep learning according to the embodiment of the present disclosure. The network consists of two sub-networks, which are respectively inputted with the waveform and the corresponding frequency spectrum of 2D data, and the output is a 1D Gaussian function of the magnitude, and the peak value corresponds to the accurate value of the magnitude.

Training the Magnitude Calculation Module by Using the Training Data Set:

3.1. Dividing the data set into training set and test set with a ratio of 8:2.

3.2. Letting a neural network model adopt a stochastic gradient descent optimization method; setting a dynamic learning rate, the initial value being set to 0.0001, reduced by half every 50 times; the batch size being set to 40; the number of iterations being 200.

3.3. Training the neural network model on a graphics processing unit (GPU).

Analyzing and Processing Field Data:

4.1. Preprocessing the field data: performing interpolation and replacement to damaged channel data by adjacent channels, removing mean value, removing abnormally large value, and replacing the removed abnormally large value by interpolation.

4.2. Inputting the preprocessed data into the magnitude calculation module to obtain the calculated magnitude.

According to another aspect of the present disclosure, there is provided a real-time microseismic magnitude calculation device based on deep learning, wherein, the calculation device is used for implementing the real-time microseismic magnitude calculation method based on deep learning according to any one of the foregoing embodiments.

The present disclosure proposes a real-time microseismic magnitude calculation method and a corresponding device based on deep learning, which integrates waveform and frequency spectrum characteristics with deep model network, and trains the model through continuous DAS strain records, without the need for converting the DAS strain data, improving the ability to quickly estimate the microseismic magnitude and improving the accuracy of the microseismic magnitude estimation.

While the embodiments of the present disclosure have been shown and described above, it is to be understood that the above embodiments are illustrative and are not to be construed as limiting the scope of the present disclosure. Changes, modifications, substitutions and variations may be made to the above embodiments by those skilled in the art within the scope of the present disclosure.

What is claimed is:

1. A real-time microseismic magnitude calculation method based on deep learning, comprising:
constructing a DAS-based horizontal well microseismic monitoring system;
constructing a training data set, comprising DAS microseismic strain data and a theoretical magnitude Gaussian distribution label;
constructing a magnitude calculation module, wherein the magnitude calculation module comprises two input branches of frequency spectrum and time waveform, the two input branches use a 3-layer convolution structure to extract a frequency characteristic and a waveform characteristic of a microseismic event, and then a model fusion is performed, and then 2 fully connected layers are used, and finally a calculated magnitude is outputted; wherein an input of the magnitude calculation module is the DAS microseismic strain data, and its output is the calculated magnitude, and error between the calculated magnitude and the theoretical magnitude Gaussian distribution is used to update network parameters; wherein the network uses a mean square error as a loss function to calculate an error of a neural network;
training the magnitude calculation module by using the training data set; and
analyzing and processing field data, comprising: preprocessing the field data; and inputting the preprocessed data into the magnitude calculation module to obtain the calculated magnitude,
wherein the constructing a training data set comprises: generating initial microseismic data; data-augmenting the initial microseismic data; and preprocessing all data;
wherein the magnitude calculation module uses a 2D convolutional layer group, and the 2D convolutional layer group comprises a convolutional layer, a max pooling layer, and a Dropout layer, wherein a convolution operation uses a ReLu activation function to extract a characteristic from the inputted data, the max pooling layer is after the convolutional layer, a rectified linear unit is used for activation in hidden convolutional layers, and the kernel size of the convolution is set to 64×3×3; the final output layer is a vector of 1*61, corresponding to magnitude −3 to magnitude 3 of seism magnitude, then a maximum value is taken as the current calculated magnitude.

2. The real-time microseismic magnitude calculation method based on deep learning according to claim 1, wherein the training data set comprises Nk DAS microseismic strain data, each DAS microseismic strain data comprises Nt channels, each channel comprises Ns sampling points, forming a data body of Nk*Nt*Ns, where Nk, Nt and Ns are all 1000.

3. The real-time microseismic magnitude calculation method based on deep learning according to claim 2, wherein the Nk DAS microseismic strain data is generated by:
setting acquisition parameters according to the DAS-based horizontal well microseismic monitoring system, comprising setting source parameters which comprises source mechanism parameters, source mechanism range and source location parameters;
using an analytical Green's function under a uniform velocity model to obtain synthetic DAS microseismic strain data, with a size of Nt*Ns;
collecting monitored field background noise data, adding the background noise data to the above-mentioned synthetic DAS microseismic strain data, simulating a signal-to-noise ratio and characteristics of collected field data, to obtain the initial microseismic data.

4. The real-time microseismic magnitude calculation method based on deep learning according to claim 3, wherein the data-augmenting the initial microseismic data comprises:
magnifying or shrinking the synthetic DAS microseismic strain data according to different amplitude scales;
constructing abnormal traces; and
magnifying or shrinking the background noise data according to different amplitude scales.

5. The real-time microseismic magnitude calculation method based on deep learning according to claim 2, wherein the preprocessing all data comprises:
performing interpolation and replacement of damaged channel data using adjacent channels, removing a mean value, removing an abnormally large value, and replacing the removed abnormally large value by interpolation.

6. The real-time microseismic magnitude calculation method based on deep learning according to claim 1, wherein the training the magnitude calculation module by using the training data set comprises:
dividing the data set into a training set and a test set with a ratio of 8:2;
letting a neural network model adopt a stochastic gradient descent optimization method; setting a dynamic learning rate, the initial value being set to 0.0001, reduced by half every 50 times; the batch size being set to 40; the number of iterations being 200; and
training the neural network model on a graphics processing unit (GPU).

7. The real-time microseismic magnitude calculation method based on deep learning according to claim 1, where:
the DAS-based horizontal well microseismic monitoring system comprises a metal sleeve and an armored optical cable fixedly arranged outside the metal sleeve, and a single-mode optical fiber is arranged in the armored optical cable;
wherein constructing a DAS-based horizontal well microseismic monitoring system comprises:
inserting the metal sleeve and the armored optical cable into a drilled wellbore synchronously;
pumping cement slurry from a bottom of a well, letting the cement slurry return to a wellhead from the bottom of the well along an annular space between an outer wall of the metal sleeve and the wellbore, allowing the metal sleeve, the armored optical cable and formation rock to be fixed together after the cement slurry is solidified; and
providing a DAS modem, and connecting the single-mode optical fiber in the armored optical cable to a DAS signal input port of the DAS modem at the wellhead.

8. A real-time microseismic magnitude calculation device based on deep learning, wherein, the calculation device is used for implementing the real-time microseismic magnitude calculation method based on deep learning according to claim 1.

9. A real-time microseismic magnitude calculation device based on deep learning, wherein, the calculation device is used for implementing the real-time microseismic magnitude calculation method based on deep learning according to claim 2.

10. A real-time microseismic magnitude calculation device based on deep learning, wherein, the calculation device is used for implementing the real-time microseismic magnitude calculation method based on deep learning according to claim 3.

11. A real-time microseismic magnitude calculation device based on deep learning, wherein, the calculation device is used for implementing the real-time microseismic magnitude calculation method based on deep learning according to claim 4.

12. A real-time microseismic magnitude calculation device based on deep learning, wherein, the calculation device is used for implementing the real-time microseismic magnitude calculation method based on deep learning according to claim 5.

13. A real-time microseismic magnitude calculation device based on deep learning, wherein, the calculation device is used for implementing the real-time microseismic magnitude calculation method based on deep learning according to claim 6.

14. A real-time microseismic magnitude calculation device based on deep learning, wherein, the calculation device is used for implementing the real-time microseismic magnitude calculation method based on deep learning according to claim 7.

* * * * *